United States Patent
Lebegue et al.

(10) Patent No.: US 11,450,219 B2
(45) Date of Patent: Sep. 20, 2022

(54) AIRCRAFT SYSTEM AND METHOD FOR ASSISTING A PILOT DURING FLIGHT

(71) Applicant: BOMBARDIER INC., Dorval (CA)

(72) Inventors: Olivier Lebegue, Outremont (CA); Benoit Ouellette, Montreal (CA)

(73) Assignee: BOMBARDIER INC., Dorval (CA)

( * ) Notice: Subject to any disclaimer, the term of this patent is extended or adjusted under 35 U.S.C. 154(b) by 160 days.

(21) Appl. No.: 16/834,241

(22) Filed: Mar. 30, 2020

(65) Prior Publication Data

US 2020/0312167 A1 Oct. 1, 2020

Related U.S. Application Data

(60) Provisional application No. 62/827,455, filed on Apr. 1, 2019.

(51) Int. Cl.
*G08G 5/02* (2006.01)
*B64D 45/08* (2006.01)
*G08G 5/00* (2006.01)

(52) U.S. Cl.
CPC .............. *G08G 5/02* (2013.01); *B64D 45/08* (2013.01); *G08G 5/0021* (2013.01)

(58) Field of Classification Search
CPC ......... G08G 5/02; G08G 5/0021; B64D 45/08
USPC ........................................................... 701/16
See application file for complete search history.

(56) References Cited

U.S. PATENT DOCUMENTS

| | | | | |
|---|---|---|---|---|
| 5,838,262 | A * | 11/1998 | Kershner | G01C 23/00 340/945 |
| 7,352,292 | B2 * | 4/2008 | Alter | G01C 23/00 340/945 |
| 7,609,200 | B1 * | 10/2009 | Woodell | G01S 13/953 342/176 |
| 8,615,337 | B1 | 12/2013 | McCusker et al. | |
| 8,718,915 | B1 * | 5/2014 | Turcios | G08G 5/0086 701/448 |
| 9,527,601 | B2 | 12/2016 | Wyatt et al. | |
| 9,936,191 | B2 | 4/2018 | Wyatt et al. | |
| 10,565,882 | B1 * | 2/2020 | VanDerKamp | G01S 19/15 |
| 10,598,932 | B1 * | 3/2020 | Marshall | G02B 27/0176 |
| 2011/0202206 | A1 * | 8/2011 | Karthikeyan | G01C 23/00 701/3 |
| 2012/0296499 | A1 * | 11/2012 | Kirchhofer | G05D 1/102 701/3 |

* cited by examiner

*Primary Examiner* — Isaac G Smith

(74) *Attorney, Agent, or Firm* — Norton Rose Fulbright Canada LLP

(57) ABSTRACT

Methods and systems for assisting a pilot during flight of an aircraft are disclosed. The method includes receiving data indicative of a current location of the aircraft during flight and data indicative of a flight boundary, and determining that the flight boundary is relevant to the aircraft. The method also includes causing a display device to display a surface representing the flight boundary relative to the current location of the aircraft.

20 Claims, 14 Drawing Sheets

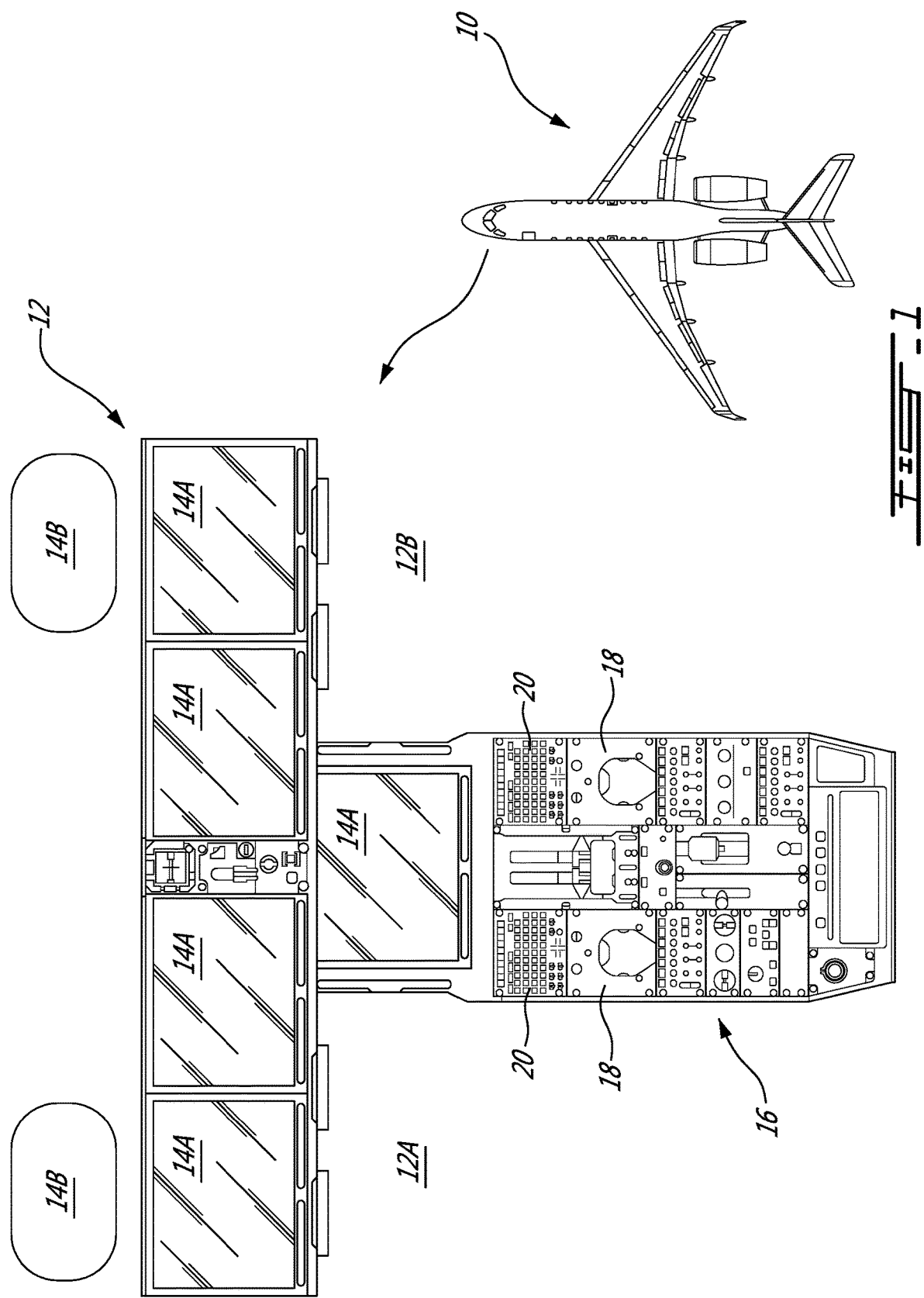

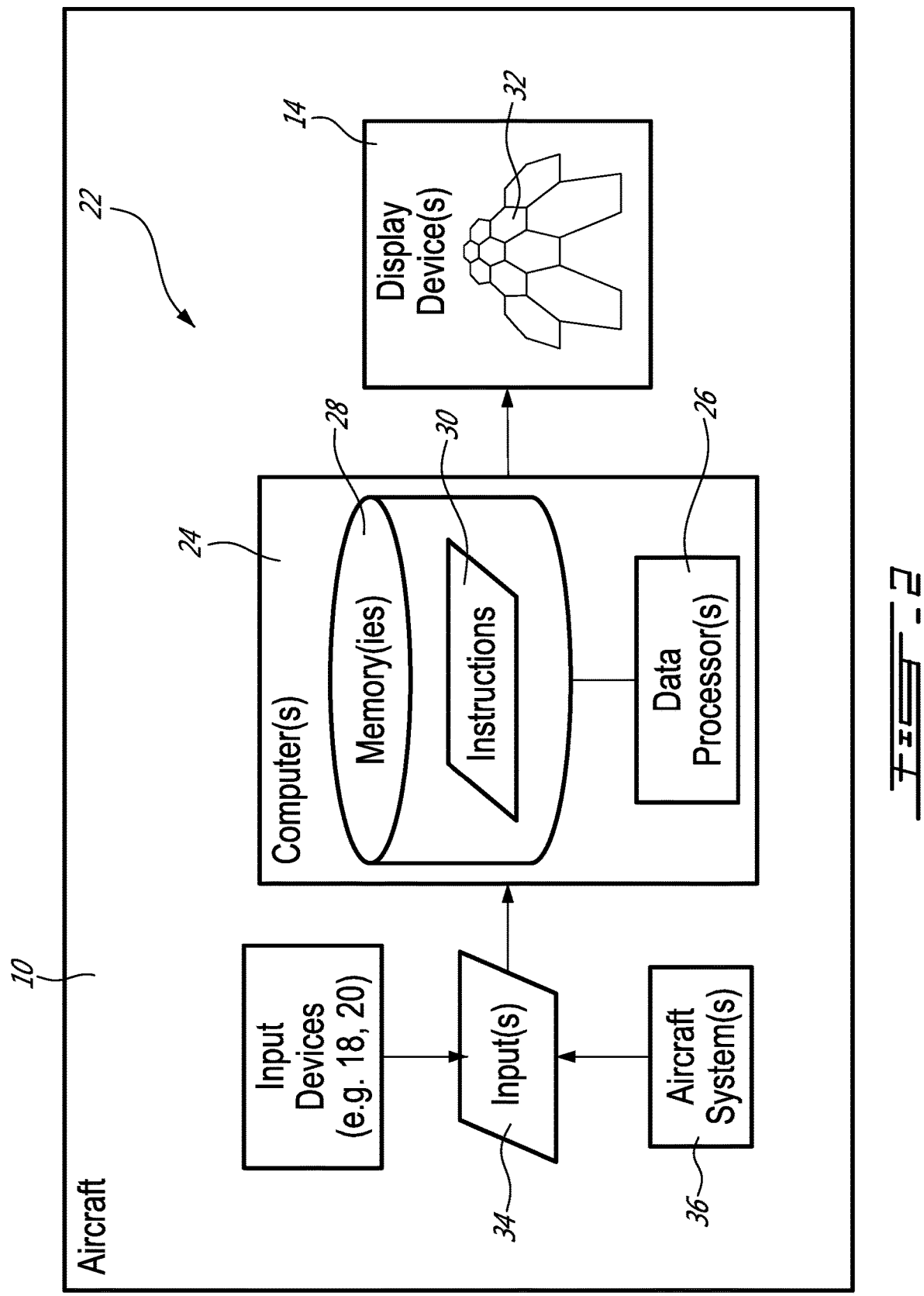

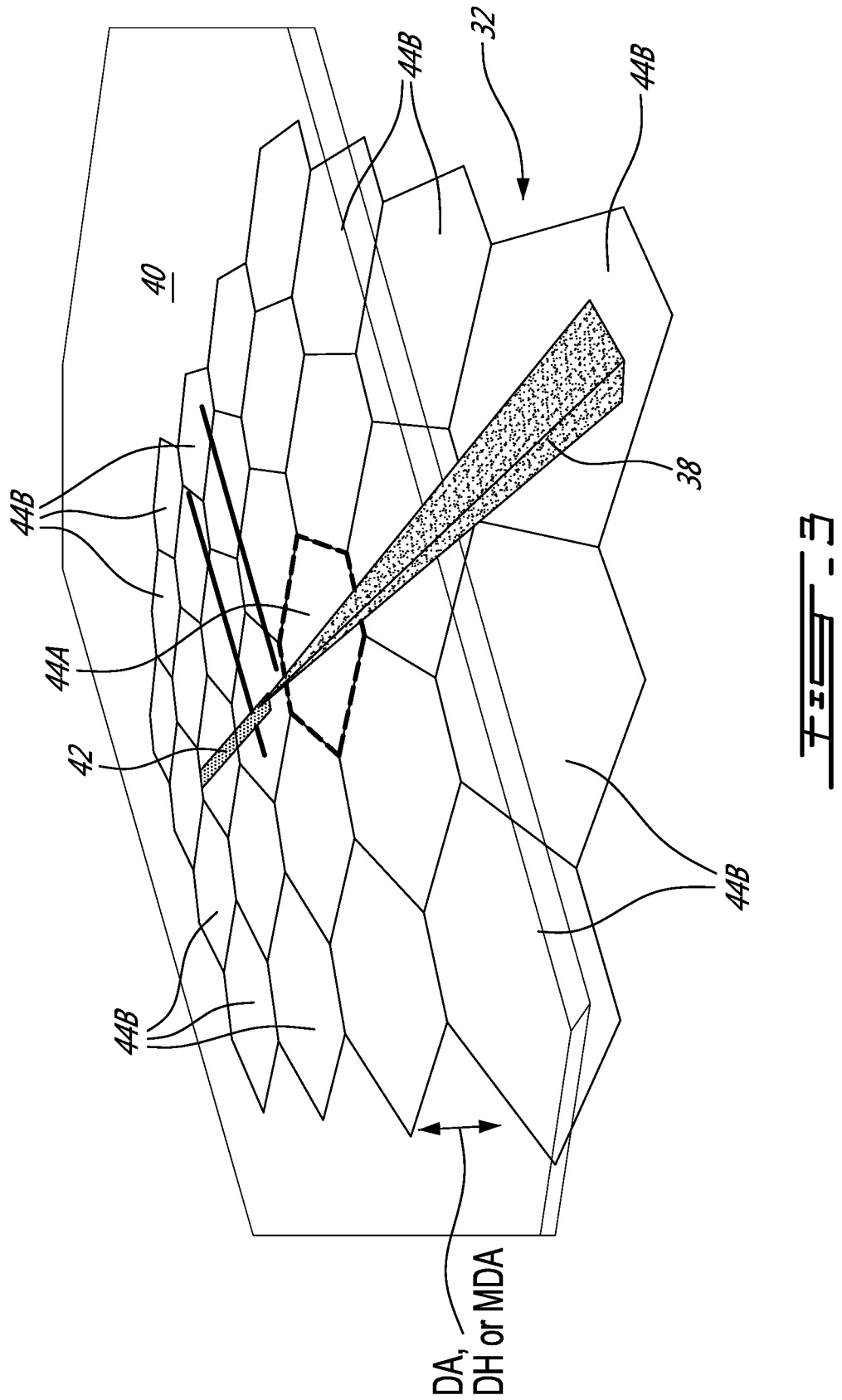

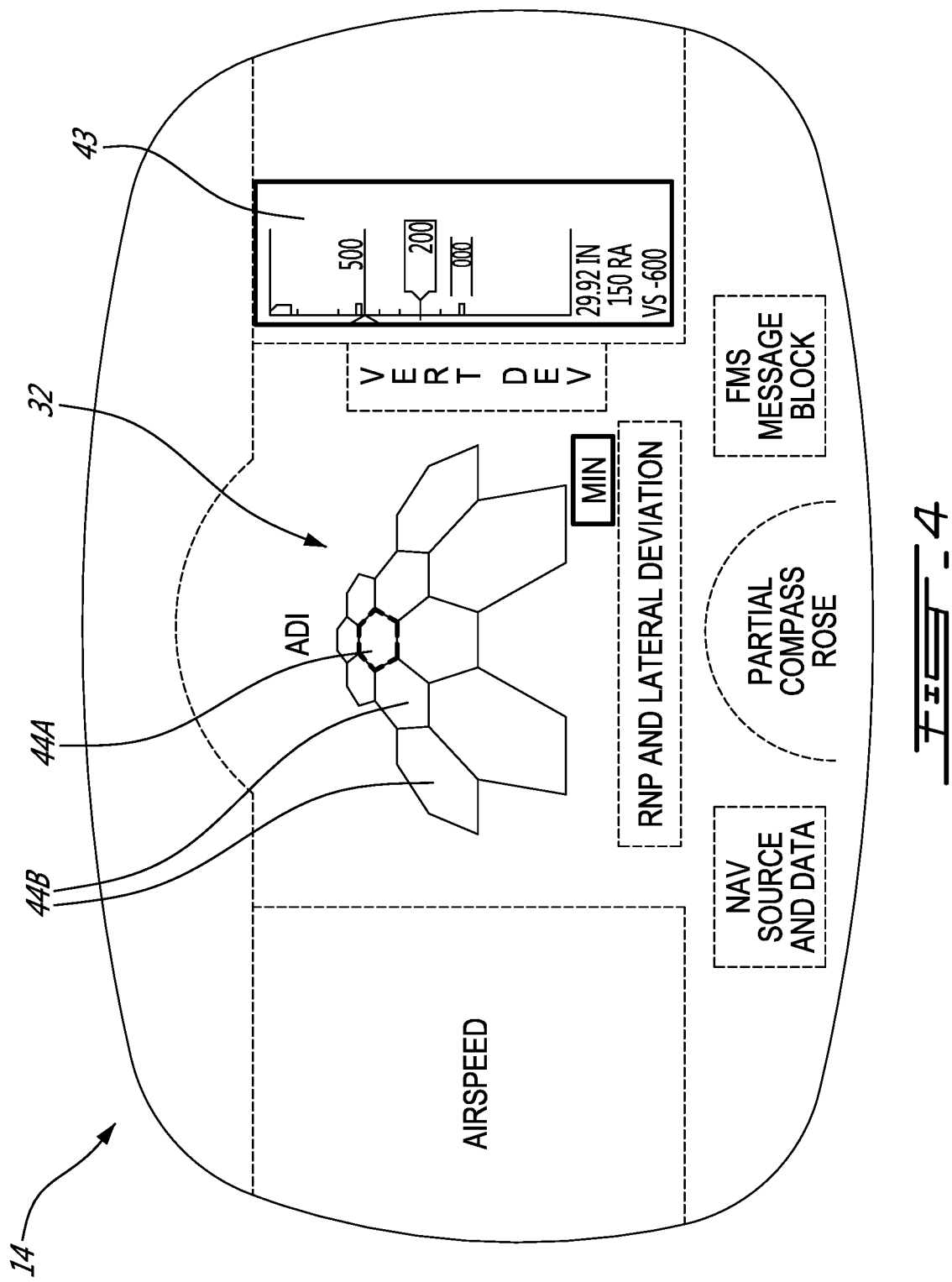

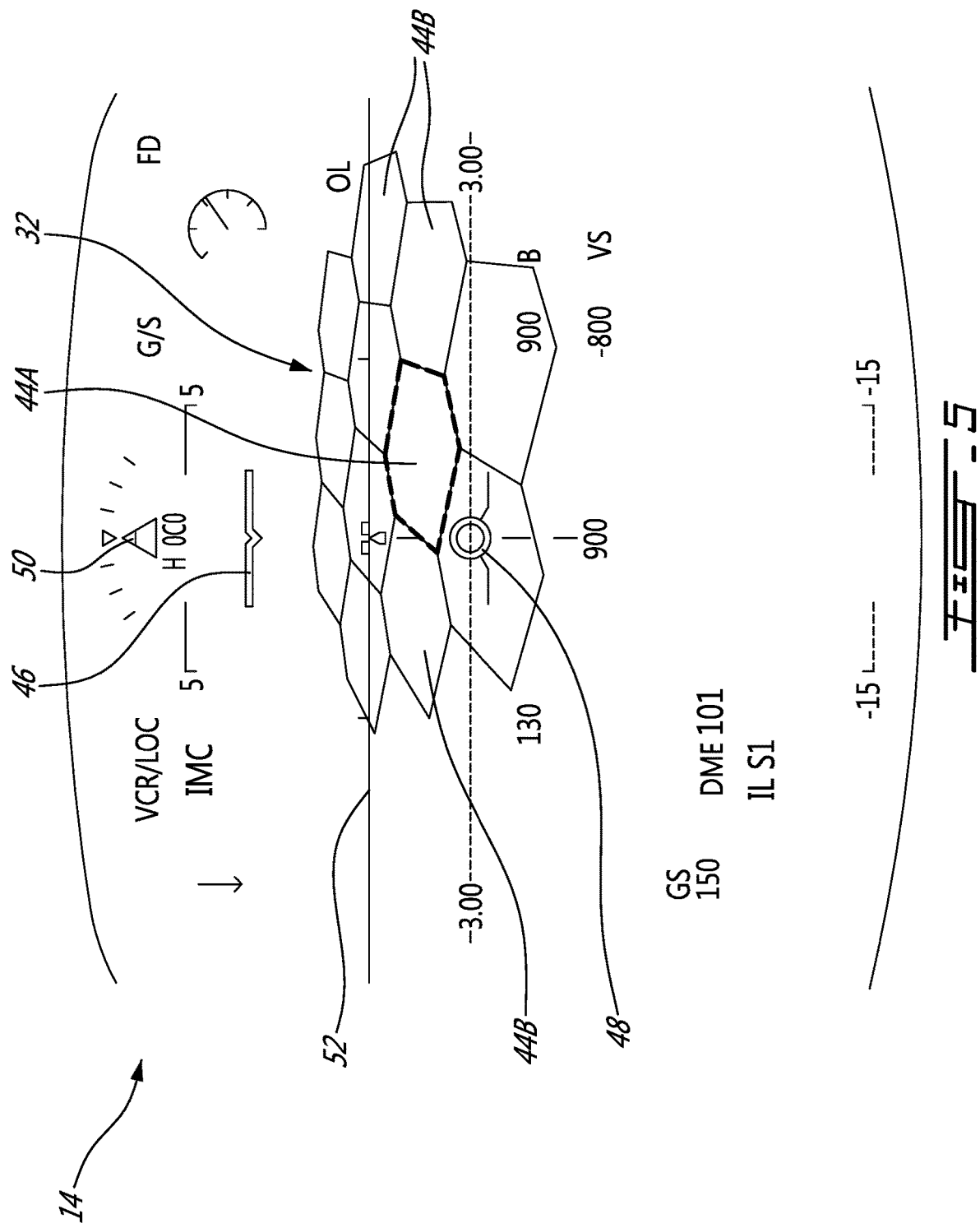

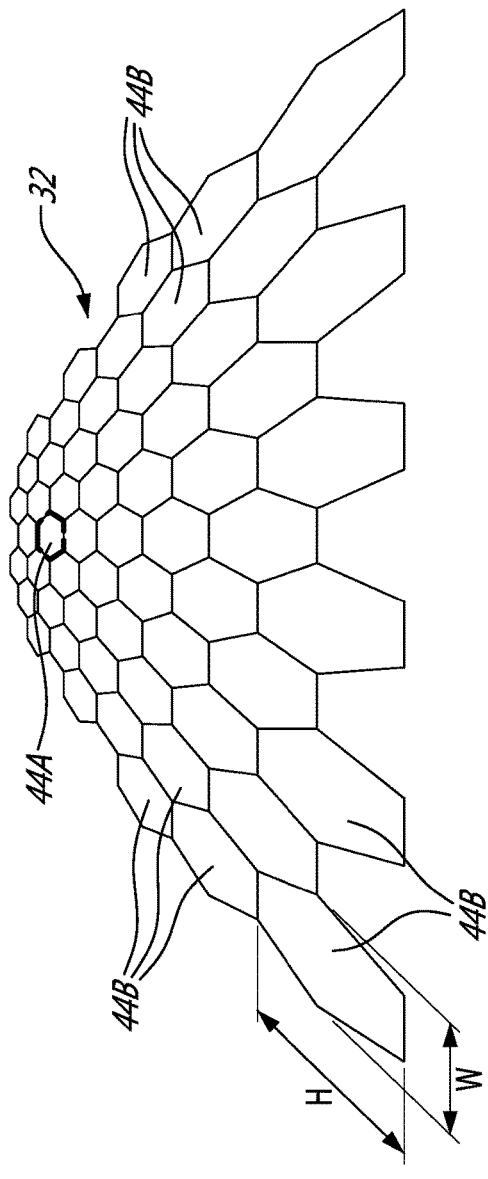
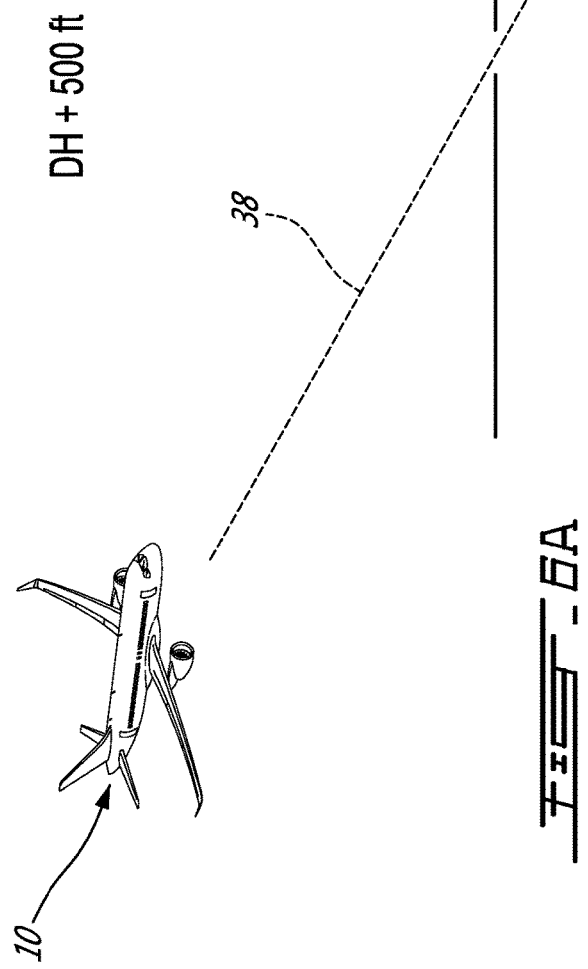
FIG. 6A

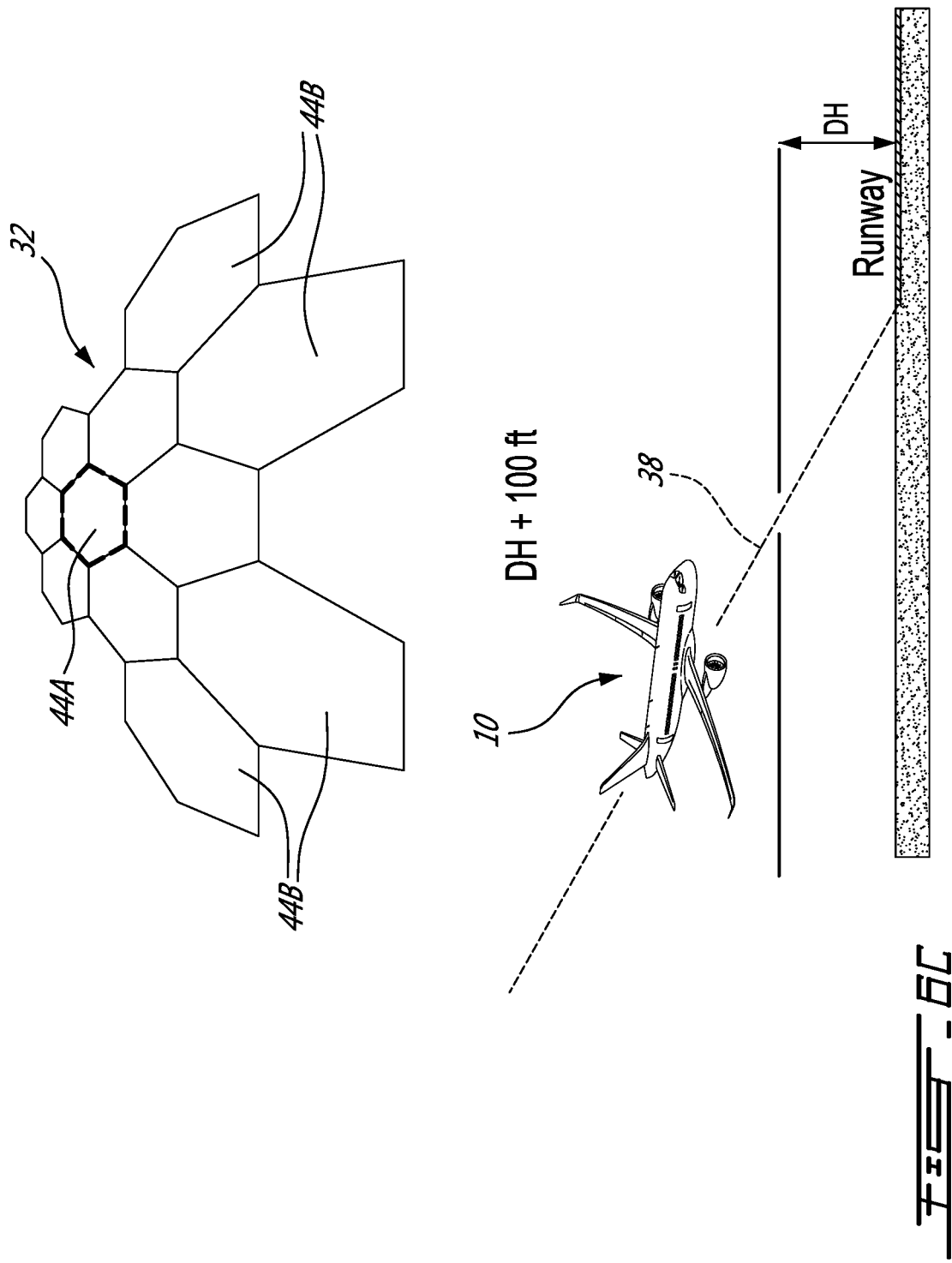

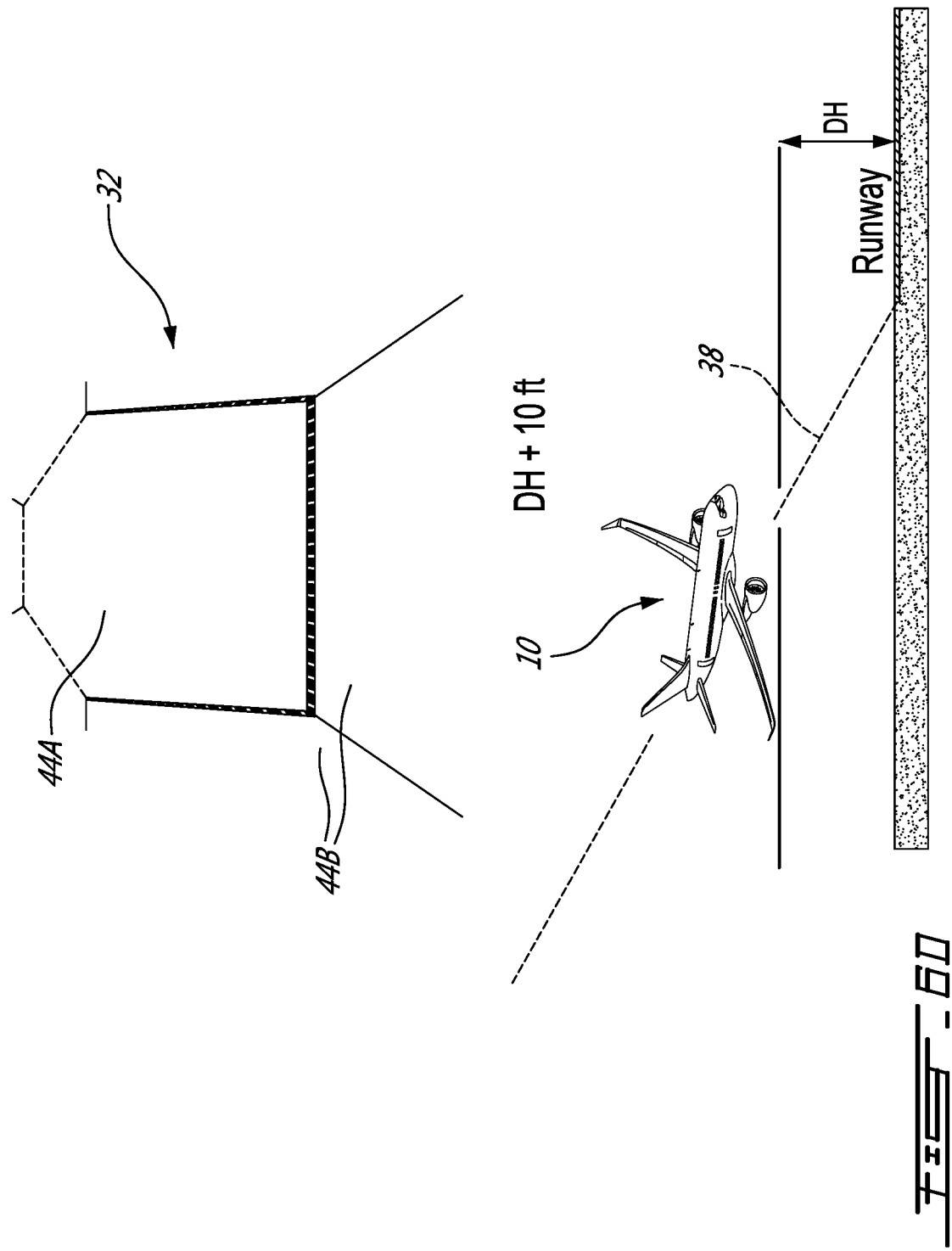

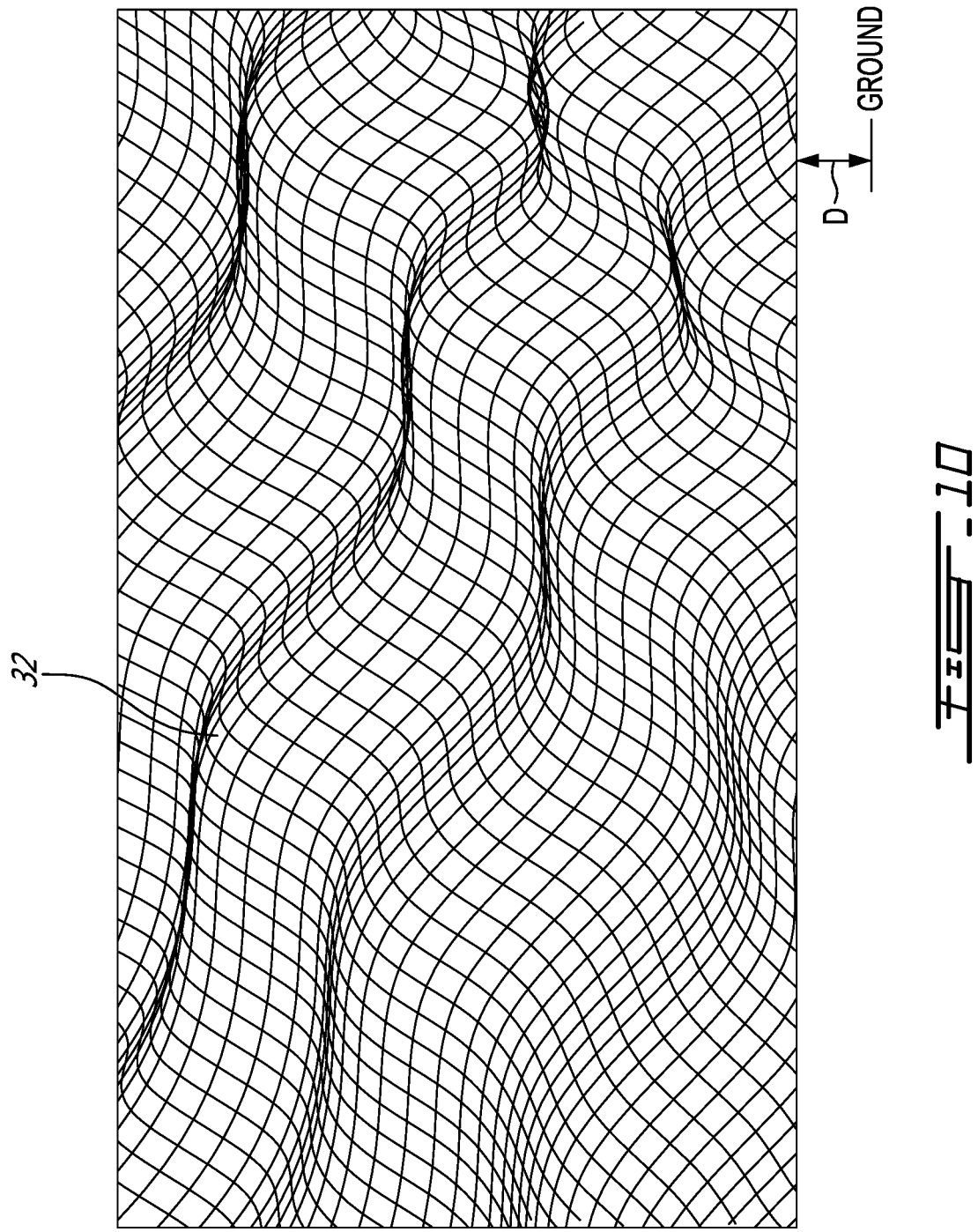

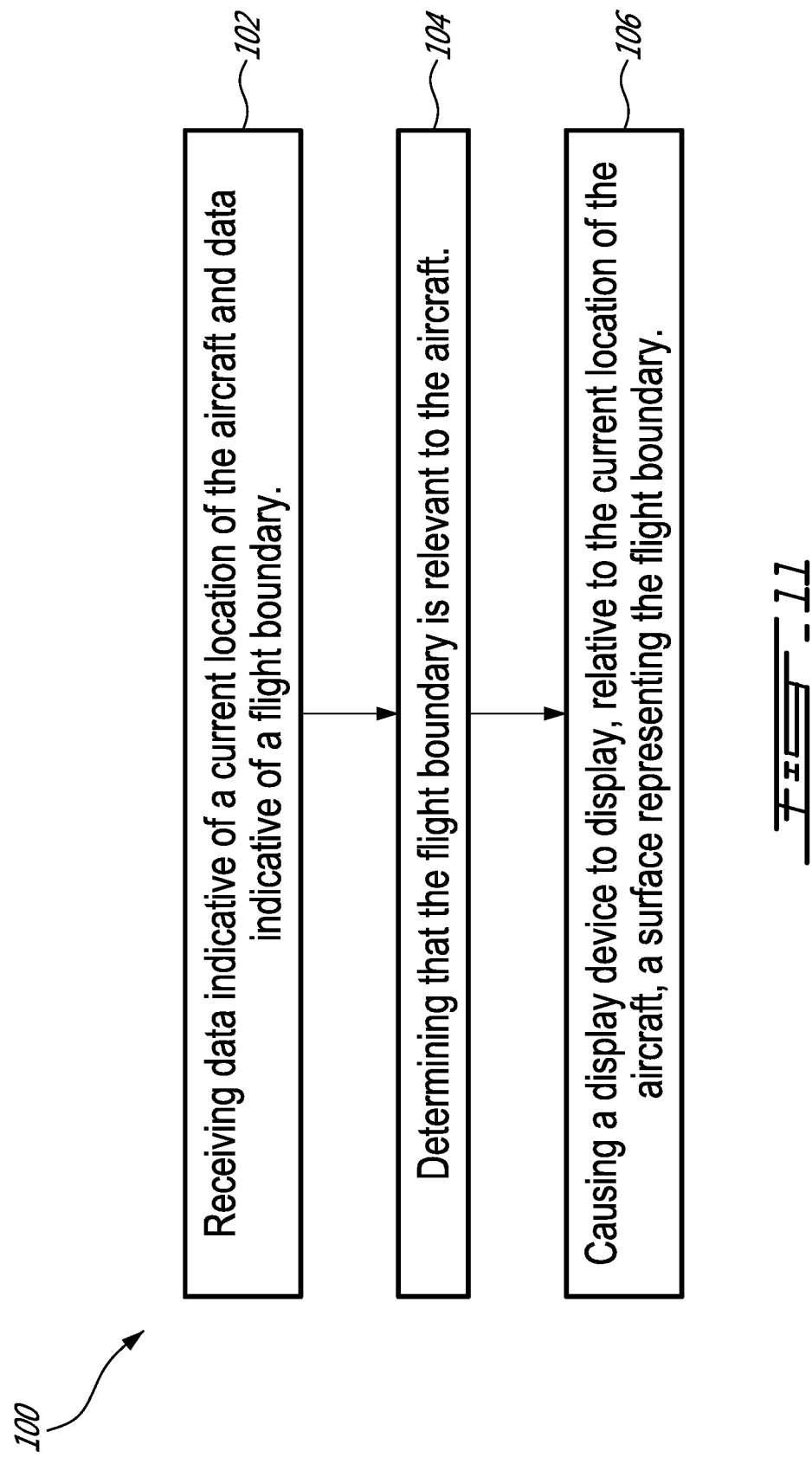

017
AIRCRAFT SYSTEM AND METHOD FOR ASSISTING A PILOT DURING FLIGHT

CROSS REFERENCE TO RELATED APPLICATION AND CLAIM OF PRIORITY

This application relies for priority on U.S. Provisional Patent Application Ser. No. 62/827,455 filed on Apr. 1, 2019, the entire content of which is incorporated herein by reference.

TECHNICAL FIELD

The disclosure relates generally to aircraft, and more particularly to systems and methods for assisting a pilot during flight by providing enhanced situational awareness.

BACKGROUND

During an aircraft's approach to landing, some aircraft can be operated according to visual flight rules (VFR) or instrument flight rules (IFR). Under VFR, a pilot operates the aircraft in weather conditions (i.e., visual meteorological conditions (VMC)) generally clear enough to allow the pilot to operate the aircraft using visual references external to the aircraft. If the meteorological conditions do not meet VMC, pilots must operate the aircraft under instrument flight rules (IFR) and operation of the aircraft must be conducted primarily through referencing the instruments rather than visual references. If the VMC are not met, the meteorological conditions are considered instrument meteorological conditions (IMC) and the aircraft may only be operated under IFR. IFR operation can require specific training and certification of the pilot and can also mandate higher equipment requirements for the aircraft.

An instrument approach conducted under IFR terminates either by the pilot acquiring sufficient visual reference to proceed to the runway, or with a missed approach because the required visual reference is not acquired in time. An instrument approach procedure is intended to orderly transfer the aircraft under instrument flight conditions from the beginning of the initial approach to a landing or to a point from which the landing can be made visually. In a precision approach, a decision height (DH) or decision altitude (DA) is a specified lowest height or altitude during the approach descent at which, if the required visual reference to continue the approach (such as the runway markings or runway environment) is not visible to the pilot, the pilot must initiate a missed approach (i.e., go-around). The specific values for DH and/or DA at a given airport are established with the intention to allow a pilot sufficient time to safely reconfigure the aircraft to climb and execute the missed approach procedure while avoiding terrain or other obstacles. A DH is a value measured in reference to a ground level while a DA is a value measured in reference to a mean sea level.

In a non-precision approach when no electronic glideslope is provided, the minimum descent altitude (MDA) is the lowest altitude, expressed in reference to the mean sea level, to which descent is authorized on final approach or during circle-to-land maneuvering. Unlike a DH or DA, a missed approach does not need to be initiated immediately upon reaching the MDA. A pilot flying a non-precision approach may descend to the MDA and maintain it until reaching the missed approach point (MAP), then initiate a missed approach if the required visual reference was not obtained. An aircraft must not descend below the MDA until visual reference is obtained and the aircraft can land while performing normal maneuvers.

Existing aircraft systems provide situational awareness relating to DH, DA or MDA that can require a significant amount of the pilots focus and attention during flight phases of high workload. Improvement is desirable.

SUMMARY

In one aspect, the disclosure describes a system for assisting a pilot during flight of an aircraft. The apparatus comprises:
   a display device;
   one or more processors operatively connected to the display device; and
   non-transitory machine-readable memory operatively connected to the one or more processors, storing instructions executable by the one or more processors and configured to cause the one or more processors to:
   using data indicative of a current location of the aircraft during flight and data indicative of a flight boundary, determine that the flight boundary is relevant to the aircraft; and
   generate an output configured to cause the display device to display, relative to the current location of the aircraft, a surface graphically representing the flight boundary.

The output may be configured to cause the display device to simultaneously display an attitude indicator and the surface representing the flight boundary.

The surface may be planar.

The surface may be non-planar.

The surface may be at least partially transparent.

The flight boundary may be a lateral flight boundary.

The flight boundary may be a vertical flight boundary.

The output may be configured to cause the display device to display a mesh of cells on the surface.

The instructions may be configured to cause the one or more processors to:
   using data indicative of a trajectory of the aircraft, identify one of the cells through which the aircraft is expected to penetrate the flight boundary; and
   cause the identified cell to be visually distinguished from one or more other cells in the mesh of cells.

The instructions may be configured to cause the one or more processors to cause a size of the cells in the mesh of cells to be defined as a function of a distance between the aircraft and the flight boundary.

The instructions may be configured to cause the one or more processors to cause the size of the cells to dynamically vary as the distance between the aircraft and the flight boundary varies.

The instructions may be configured to cause the one or more processors to cause an aspect ratio of the cells to be defined as a function of the current location of the aircraft.

Some or all of the cells may be hexagons.

The instructions may be configured to cause the one or more processors to cause an appearance of the surface to vary as a distance between the aircraft and the flight boundary varies.

The flight boundary may be a decision height, a decision altitude or a minimum descent altitude associated with an approach conducted under instrument flight rules.

The flight boundary may be a virtual terrain protection floor disposed a predetermined distance above a ground. The instructions may be configured to cause the one or more processors to, using data indicative of terrain, cause the surface to depict a change in elevation indicative of a corresponding change in elevation in the terrain.

The flight boundary may demarcate a restricted airspace.
The display device may be a head-down display device.
The display device may be a head-up display device.
The display device may be a primary flight display device.
Embodiments can include combinations of the above features.

In another aspect, the disclosure describes an aircraft comprising a system as described herein.

In another aspect, the disclosure describes a computer-implemented method for assisting a pilot during flight of an aircraft. The method comprises:

receiving data indicative of a current location of the aircraft during flight and data indicative of a flight boundary;

using the data indicative of the current location of the aircraft and the data indicative of the flight boundary, determining that the flight boundary is relevant to the aircraft; and causing a display device to display, relative to the current location of the aircraft, a surface graphically representing the flight boundary.

The method may comprise causing the display device to simultaneously display an attitude indicator and the surface representing the flight boundary.

The surface may be planar.
The surface may be non-planar.
The surface may be at least partially transparent.
The flight boundary may be a lateral flight boundary.
The flight boundary may be a vertical flight boundary.
The method may comprise causing the display device to display a mesh of cells on the surface.

The method may comprise:
using data indicative of a trajectory of the aircraft, identifying one of the cells through which the aircraft is expected to penetrate the flight boundary; and
causing the identified cell to be visually distinguished from one or more other cells in the mesh of cells.

The method may comprise causing a size of the cells in the mesh of cells to be defined as a function of a distance between the aircraft and the flight boundary.

The method may comprise dynamically varying the size of the cells in the mesh of cells as the distance between the aircraft and the flight boundary varies.

The method may comprise defining an aspect ratio of the cells in the mesh of cells as a function of the current location of the aircraft.

Some or all of the cells may be hexagons.

The method may comprise causing an appearance of the surface to vary as a distance between the aircraft and the flight boundary varies.

The flight boundary may be a decision height, a decision altitude or a minimum descent altitude associated with an approach conducted under instrument flight rules.

The flight boundary may be a virtual terrain protection floor disposed a predetermined distance above a ground.

The flight boundary may be a virtual terrain protection floor disposed a predetermined distance above a ground and the method may comprise using data indicative of terrain to cause the surface to depict a change in elevation indicative of a corresponding change in elevation in the terrain.

The flight boundary may demarcate a restricted airspace.
The display device may be a head-down display device.
The display device may be a head-up display device.
The display device may be a primary flight display device.

Embodiments can include combinations of the above features.

In another aspect, the disclosure describes a computer program product for a method for assisting a pilot during flight of an aircraft. The computer program product may comprise a non-transitory computer readable storage medium containing program code. The program code may be readable/executable by a computer, processor or logic circuit to perform a method as described herein.

Further details of these and other aspects of the subject matter of this application will be apparent from the detailed description included below and the drawings.

DESCRIPTION OF THE DRAWINGS

Reference is now made to the accompanying drawings, in which:

FIG. 1 shows an exemplary aircraft flight deck and a corresponding exemplary aircraft including the flight deck;

FIG. 2 shows a schematic representation of an exemplary system for assisting a pilot during flight of an aircraft;

FIG. 3 shows an exemplary surface representing a flight boundary together with a trajectory of the aircraft;

FIG. 4 shows an exemplary display device displaying the surface representing the flight boundary;

FIG. 5 shows the surface representing the flight boundary displayed on the display device simultaneously with other objects;

FIGS. 6A-6D show a graphical representation of the surface of FIG. 5 at different distances between the aircraft and the flight boundary graphically represented by the surface;

FIG. 10 shows an exemplary surface representing a virtual terrain protection floor disposed a predetermined distance above a ground; and FIG. 11 is a flowchart of a method for assisting a pilot during flight of an aircraft.

DETAILED DESCRIPTION

Figure 6B:
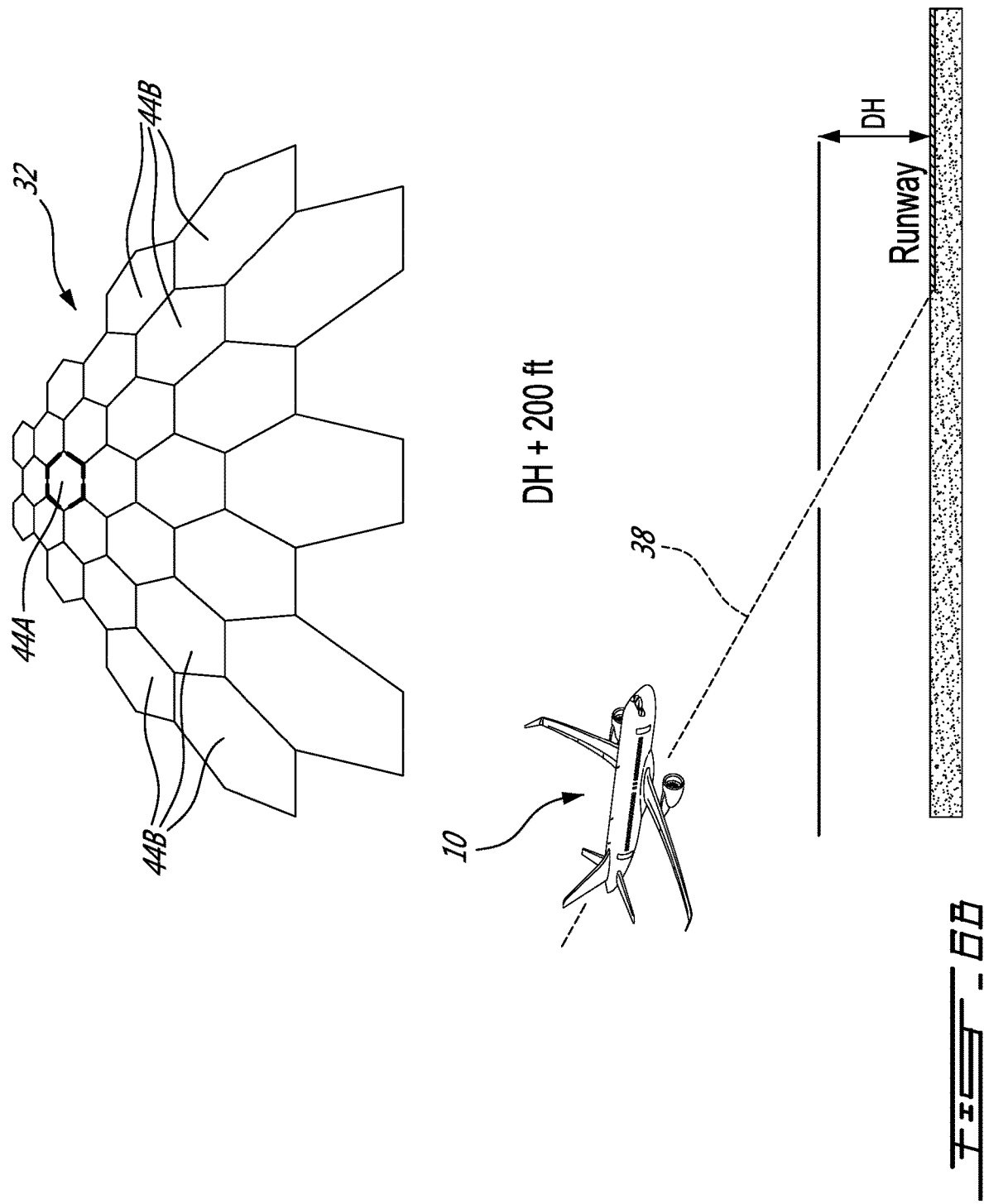

The following description describes systems and methods for assisting a pilot during flight of an aircraft. In various embodiments, the systems and methods disclosed herein can improve the operation of an aircraft flight deck by providing a contextual synthetic visual (e.g., graphical) representation of one or more flight boundaries to the pilot in an intuitive and non-obstructive manner that can enhance the situational awareness of the pilot during phases of flight of relatively high workload. Such enhancement in situational awareness can improve flight safety by helping reduce the potential for pilot error such as the unintended crossing of such flight boundaries. The systems and methods described herein can be used during approaches to landing and/or during other phases of flight.

As explained below, such flight boundaries can include high or low vertical flight boundaries (e.g., decision height (DH), decision altitude (DA), minimum descent altitude (MDA), a virtual terrain protection floor and high or low altitude limits) and/or left or right lateral flight boundaries that demarcate restricted airspace, mountains or other obstacles for example. The flight boundaries referenced herein can be virtual such that they do not represent surfaces of real physical objects (e.g., ground, buildings or mountains) in the vicinity of the aircraft. Instead, the flight boundaries can be disposed above the ground and be spaced apart from actual objects in order to, for example, provide a safe clearance distance between the aircraft and such object(s).

Aspects of various embodiments are described through reference to the drawings.

FIG. 1 shows an exemplary aircraft 10 and a partial schematic representation of flight deck 12 which can be part of aircraft 10. Aircraft 10 can be a corporate, private, commercial or any other type of aircraft. For example, aircraft 10 can be a fixed-wing or rotary-wing aircraft. In some embodiments, aircraft 10 can be a narrow-body, twin engine jet airliner or an (e.g., ultra-long-range) business jet. Aircraft 10 can be a drone controlled remotely. Even though various aspects of the present disclosure are described in the context of aircraft 10, it is understood that aspects disclosed herein are also applicable to other mobile platforms (e.g., vehicles) such as trains, ships and busses where a graphically represented boundary could instead represent an upcoming deceleration or stopping point for such mobile platforms for example.

Flight deck 12 can include additional or fewer elements than those shown and described herein. Flight deck 12 can include left portion 12A intended to be used by a pilot (sometimes referred as "captain") of aircraft 10 and right portion 12B intended to be used by a co-pilot (sometimes referred as "first officer") of aircraft 10. As referenced herein, the term "pilot" is intended to encompass an individual responsible for the operation of aircraft 10 during flight such as a pilot or a co-pilot. Left portion 12A and right portion 12B can have functionally identical components so that at least some operational redundancy can be provided between left portion 12A and right portion 12B of flight deck 12.

Flight deck 12 can include one or more display devices 14A, 14B (referred generally herein as "display device 14") providing respective display areas. In the exemplary configuration of flight deck 12 shown in FIG. 1, left portion 12A and right portion 12B can each include two head-down display devices 14A (referred hereinafter in the singular as "HDD 14A") and an additional HDD 14A can be provided in pedestal region 16 of flight deck 12. HDD 14A provided in pedestal region 16 can be shared by the two pilots during normal operation of aircraft 10. HDDs 14A can include one or more cathode-ray tubes (CRTs), liquid crystal displays (LCDs), plasma displays, light-emitting diode (LED) based displays or any type of display device suitable for use in flight deck 12. HDDs 14A can be configured to dynamically display operational and status information about various systems of aircraft 10, information related to flight/mission planning, maps and any other information that can be useful for the pilot during the operation of aircraft 10. HDDs 14A can facilitate dialog between the pilot and various systems of aircraft 10 via suitable graphical user interfaces. Flight deck 12 can include one or more data input devices such as, for example, one or more cursor control devices 18, one or more multi-function keypads 20 that permit data entry by the pilot. In some embodiments, one or more HDDs 14A could have touch sensitive display area(s) to permit user input by way of the pilot touching the applicable display area(s).

Flight deck 12 can also include one or more head-up display devices 14B (referred hereinafter in the singular as "HUD 14B") which can be transparent displays that can present data without requiring the pilot to look away from his/her usual point out the windshield of aircraft 10. HUD 14B can present information to the pilot while the pilot's head is positioned "up" and looking forward, instead of angled down looking at lower instruments or displays such as HDDs 14A. In various embodiments, right and left portions 12A, 12B of flight deck 12 can each have a HUD 14B or, alternatively, flight deck 12 can include only one HUD 14B disposed in left portion 12A of flight deck 12 for example. HUDs 14A can either be fix-mounted displays or head-mounted displays (including helmet-mounted displays). In various embodiments, HUD 14B can include a CRT configured to generate an image on a phosphor screen, a solid state light source such as a LED that is modulated by an LCD screen to display an image, optical waveguides that produce an image directly in a combiner, or a scanning laser configured to display an image on a transparent medium.

It is understood that aspects of this disclosure, including the display of flight boundaries, are not limited to one or more display devices 14 that are part of flight deck 12 or that are onboard aircraft 10. For example, the display of flight boundaries and associated steps could, alternatively or in addition, be performed off of aircraft 10 using a system and/or display device 14 that are off of aircraft 10 and are used to control aircraft 10 remotely. For example, relevant information could be transmitted between aircraft 10 and a location remote from aircraft 10 (e.g., ground station) in order to be used by an operator (i.e., pilot) controlling/flying aircraft 10 remotely.

FIG. 2 shows a schematic representation of an exemplary system 22 which can be part of aircraft 10 or off of aircraft 10 and which can assist a pilot during flight of aircraft 10 by providing enhanced situational awareness to the pilot. System 22 can be integrated with flight deck 12. System 22 can include one or more computers 24 (referred hereinafter in the singular) operatively connected to one or more display devices 14 (e.g., HDD 14A and/or HUD 14B) of flight deck 12. Computer 24 can be configured to control at least some of the information/content displayed on display device 14. Computer 24 can include one or more data processors 26 (referred hereinafter in the singular) and one or more computer-readable memories 28 (referred hereinafter in the singular) storing machine-readable instructions 30 executable by data processor 26 and configured to cause data processor 26 to generate one or more outputs including one or more signals for causing display device 14 of aircraft 10 to display one or more surfaces 32 representing one or more respective flight boundaries.

Computer 24 can receive input(s) 34 in the form of data or information that can be processed by data processor 26 according to instructions 30 in order to generate suitable output for controlling display device 14. Input 34 can include information (data) indicative of a condition of aircraft 10. Input 34 can be received via manual entry by the pilot using one or more pilot input devices such as cursor control device 18 and/or multi-function keypad 20 for example. Alternative or in addition, input 34 can be received automatically from one or more data sources (e.g., aircraft systems 36) operatively connected to computer 24 such as a navigation system, a terrain database of a synthetic vision system, a flight management system, an air data system and/or a (e.g., radar) altimeter for example. Input 34 can include operating parameters of aircraft 10 measured via suitable sensors or derived from data acquired via such sensors. Input 34 can include data indicative of a current location of aircraft 10 during flight, data indicative of a trajectory of aircraft 10, data indicative of a speed (e.g., air speed or ground speed) of aircraft 10, data indicative of terrain in proximity of aircraft 10, data indicative of an altitude of aircraft 10, data indicative of one or more flight boundaries for example. Input 34 can include information (data) indicative of a substantially real-time status of aircraft 10.

Computer 24 can be part of an avionics suite of aircraft 10 and be operatively integrated with avionic components of aircraft 10. For example, in some embodiments, computer 24 can be configured to carry out additional functions than those described herein including the management of one or more graphic user interfaces of flight deck 12 and/or other part(s) of aircraft 10. The methods disclosed herein (or part(s) thereof) could be performed using a plurality of computers 24 or data processors 26, or, alternatively, be performed entirely using a single computer 24 or data processor 26. In some embodiments, computer 24 could be physically integrated with (e.g., embedded in) display device 14.

Data processor 26 can include any suitable device(s) configured to cause a series of steps to be performed by computer 24 so as to implement a computer-implemented process such that instructions 30, when executed by computer 24, can cause the functions/acts specified in the methods described herein to be executed. Data processor 26 can include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 28 can include any suitable known or other machine-readable storage medium. Memory 28 can include non-transitory computer readable storage medium such as, for example, but not limited to, an electronic, magnetic, optical, electromagnetic, infrared, or semiconductor system, apparatus, or device, or any suitable combination of the foregoing. Memory 28 can include a suitable combination of any type of computer memory that is located either internally or externally to computer 24. Memory 28 can include any storage means (e.g. devices) suitable for retrievably storing machine-readable instructions 30 executable by data processor 26.

Various aspects of the present disclosure can be embodied as apparatus, devices, methods and/or computer program products. Accordingly, aspects of the present disclosure can take the form of an entirely hardware embodiment, an entirely software embodiment (including firmware, resident software, micro-code, etc.) or an embodiment combining software and hardware aspects. Furthermore, aspects of the present disclosure can take the form of a computer program product embodied in one or more non-transitory computer readable medium(ia) (e.g., memory 28) having computer readable program code (e.g., instructions 30) embodied thereon. The computer program product can, for example, be executed by computer 24 to cause the execution of one or more methods disclosed herein in entirety or in part.

Instructions 30 (e.g., computer program code) for carrying out operations for aspects of the present disclosure can be written in any combination of one or more programming languages, including an object oriented programming language and conventional procedural programming languages. Such program code can be executed entirely or in part by computer 24 or other data processing device(s). It is understood that, based on the present disclosure, one skilled in the relevant arts could readily write computer program code for implementing the methods disclosed herein.

FIG. 3 shows an exemplary synthetically generated surface 32 graphically representing an exemplary vertical flight boundary together with a projected trajectory 38 of aircraft 10. Surface 32 together with other graphical or textual objects can be displayed on HDD 14A and/or HUD 14B. The flight boundary represented by surface 32 can be disposed above airfield 40 including one or more runways 42, by a vertical distance that represents a DH, DA or MDA for example. In the depicted embodiment, surface 32 is shown to be substantially planar and is shown in a perspective view suitable for display on display device 14. In some embodiments, surface 32 can be non-planar. The orientation and position of surface 32 can be selected to be in relation to the current location of aircraft 10 to provide an intuitive graphical representation to the pilot. For example, the orientation and position of surface 32 can be conformal with other graphical objects (e.g., relevant ground references sought by the pilot) displayed on the same display device 14 so that surface 32 can be in proper spatial relation to the other graphical objects in a single integrated image. For example, image registration can be performed by computer 24 via instructions 30 to achieve proper spatial relation of surface 32 with other objects. Accordingly, surface 32 can be displayed in relation to a current location of aircraft 10 and in an egocentric perspective that is compatible with HUD 14B.

Surface 32 can be at least partially transparent so as to not significantly obstruct the view of other objects shown on display device 14. For example, surface 32 can be displayed in the form of an additional layer of information that is superimposed on other objects. In some embodiments, surface 32 can have the form of a wireframe representing a mesh of cells 44A, 44B on surface 32. The outlines of cells 44A, 44B can be represented by lines and the areas within cells 44A, 44B can be substantially transparent to limit the visual obstruction of other objects shown within the same display area. Cells 44A, 44B can be hexagons or have another suitable shape (e.g., square, rectangular, octagonal). In some embodiments, hexagonal cells 44A, 44B can be more distinctive and therefore preferred to avoid potential confusion with other objects shown simultaneously by the same display device 14.

The scenario depicted in FIG. 3 can represent an approach to landing conducted under IFR where aircraft 10 is expected to land at runway 42 and the pilot must acquire sufficient visual reference by the time the flight boundary (e.g., DH or DA) is reached, or otherwise execute a missed approach. The image of airfield 40 and of runway 42 can be of the actual airfield 40 and runway 42 as seen by the pilot through HUD 14B. Alternatively or in addition, the images of airfield 40 and of runway 42 can be generated on HUD 14B or HDD 14A by way of a synthetic vision system which uses navigation, attitude and terrain databases to create realistic and intuitive views of the outside world, and/or by way of an enhanced vision system which uses imaging sensors to provide views of the outside world. However, a synthetic vision system and/or an enhanced vision system are not necessary for some embodiments of the systems 22 and methods disclosed herein.

Trajectory 38 can be a projected flight path ahead of aircraft 10 indicating the expected flight path of aircraft 10 for a period of time in the future. Trajectory 38 may or may not be displayed together with surface 32 on display device 14. Nevertheless, information indicative of trajectory 38 can be used to calculate an intersection point between trajectory

38 (e.g., a line) and surface 32 (e.g., a plane). Such intersection point can be used to graphically indicate a location on surface 32 at which aircraft 10 is expected to penetrate the flight boundary represented by surface 32. Such intersection point can be indicated on surface 32 using a symbol, arrow, marker or other graphical object. In embodiments where a mesh of cells 44A, 44B is shown on surface 32, the intersection point of trajectory 38 and surface 32 can be used to identify cell 44A in which the intersection point lies. The identified cell 44A can then be visually distinguished from other cells 44B in the mesh of cells in order to indicate which cell 44A (e.g., penetration zone/window) on surface 32 aircraft 10 is expected to pass through. Visually distinguishing cell 44A from other cells 44B can be done by highlighting, changing the color, changing the line width and/or changing the line type of the lines used to outline the identified cell 44A for example. Alternatively, visually distinguishing cell 44A from other cells 44B can be done by applying a translucent shading in the area of the identified cell 44A while keeping the other cells 44B transparent. In some embodiments, a shadow of the wireframe displayed on surface 32 can be displayed on other objects such as airfield 40 and runway 42 in order to enhance the perception of the spacing between surface 32 and such other objects.

In some embodiments, surface(s) 32 can be displayed on display device 14 only when the corresponding flight boundary(ies) are relevant to aircraft 10 and hence important to the pilot. For example, the determination of whether or not surface(s) 32 should be displayed can be made based on the proximity of aircraft 10 to the corresponding flight boundary (ies). Accordingly, instructions 30 can be configured to cause computer 24 to use data indicative of the current location of aircraft 10 and data indicative of the location of the flight boundary to determine whether the distance between aircraft 10 and the flight boundary is within a predetermined distance (i.e., a relevancy distance threshold) that indicates that the flight boundary is relevant to aircraft 10 at the current time. Similarly, instructions 30 can be configured to cause computer 24 to determine when the one or more flight boundaries are no longer relevant (e.g., no longer within the relevancy distance threshold) and should be removed from display device 14. Different types of flight boundaries can have different relevancy distance thresholds associated with them. In some embodiments, locations, types and corresponding relevancy distance thresholds could be stored in a suitable look-up table in memory 28 or otherwise be accessible to computer 24. Computer 24 can be configured via instructions 30 to automatically determine when one or more flight boundaries become relevant or irrelevant and cause surface(s) 32 to be displayed or not displayed on display device 14.

The presence of surface 32 displayed within the same scene as airfield 40, runway 42 and/or other objects can provide a clear and intuitive representation of the flight boundary and enhance situational awareness for the pilot. For example, surface 32 can graphically represent the notion of a floor, ceiling or wall of which the pilot should be aware. In some situations, the display of surface 32 can reduce the risk of a pilot inadvertently descending below the DH, DA or MDA, especially in single-pilot operation of aircraft 10. In some embodiments, surface 32 can make it obvious to the pilot(s) that they are about to cross an altitude/height below which they cannot descend without first having a visual reference of runway 42.

FIG. 4 shows an exemplary display area of display device 14 showing surface 32 representing a vertical flight boundary. Surface 32 can be displayed in an area of display 14 that is typically used for an attitude indicator labeled as "ADI" in FIG. 4 that informs the pilot of the pitch and roll characteristics of aircraft 10 and the orientation of aircraft 10 with respect to the horizon substantially in real time. Accordingly, display device 14 can be a primary flight display and/or a head-up display where the attitude indicator is located generally centrally in the applicable display area. Surface 32 can be displayed on display device 14 simultaneously with other objects associated with the attitude indicator. Display device 14 can also display other information such as an airspeed indicator, an altitude indicator (tape) 43 and a vertical speed indicator simultaneously with surface 32 for example. In some situations when surface 32 is displayed, altitude indicator 43 could be removed during a final approach to landing in order to de-clutter the display area of display device 14.

FIG. 5 shows surface 32 representing a vertical flight boundary displayed on display device 14 simultaneously with other objects. Such objects can be associated with the attitude indicator and/or can include other HUD symbology for example. As explained above, surface 32 can be visually integrated with other objects displayed on display device 14 such as aircraft reference symbol 46, flight path symbol 48, roll scale pointer 50 and horizon line 52 for example. In some embodiments, surface 32 can optionally be displayed together and simultaneously with synthetic vision system and/or enhanced vision system images.

FIGS. 6A-6D show perspective views of surface 32 in isolation and corresponding schematic illustrations of aircraft 10 at different distances from an applicable vertical flight boundary. FIGS. 6A-6D show the flight boundary as being a DH but it is understood that the characteristics of surface 32 shown in FIGS. 6A-6D are also applicable to other types of vertical flight boundaries and lateral flight boundaries. FIGS. 6A-6D progressively show a change in appearance of surface 32 as aircraft 10 moves closer to the flight boundary. FIG. 6A illustrates aircraft 10 being at a location that is 500 ft above the DH and the corresponding appearance of surface 32 that is shown on display device 14 when aircraft 10 is at this location. FIG. 6B illustrates aircraft 10 being at a location that is 200 ft above the DH and the corresponding appearance of surface 32 that is shown on display device 14 when aircraft 10 is at this altitude. FIG. 6C illustrates aircraft 10 being at a location that is 100 ft above the DH and the corresponding appearance of surface 32 that is shown on display device 14 when aircraft 10 is at this altitude. FIG. 6D illustrates aircraft 10 being at a location that is 50 ft above the DH and the corresponding appearance of surface 32 that is shown on display device 14 when aircraft 10 is at this altitude.

In reference to FIG. 6A, the distance of 500 ft could, as an example, represent the relevancy distance threshold at which DH becomes relevant to the pilot of aircraft 10 and hence becomes displayed on display device 14 in the form of surface 32. After aircraft 10 has passed through DH via cell 44A at a moment following the situation shown in FIG. 6D, surface 32 representing DH may disappear from display 14.

The change in appearance of surface 32 as aircraft 10 approaches the DH can provide a sense of anticipation and closure, and thereby contributes toward enhancing the situational awareness of the approaching flight boundary by requiring less of the pilot's attention compared to existing systems. In various embodiments, the presentation of surface 32 can be used instead of or in addition to any other alerting method(s) associated with the applicable flight boundary. In some embodiments, the change of appearance of surface 32 can be a change in the scale of the mesh of cells 44A, 44B. For example, a size of the cells in the mesh of cells could be defined as a function of the distance between aircraft 10 and the DH. In some embodiments, computer 24 can, via instructions 30, be configured to cause the size of at least some cells 44A, 44B to change (e.g., dynamically and in substantially real-time) as the distance between aircraft 10 and the DH changes. For example, the size of cells 44A, 44B could be increases as aircraft 10 gets closer to the applicable flight boundary.

In some embodiments, the appearance of surface 32 can also be varied as a function of the speed of aircraft 10. For example, computer 24 can, via instructions 30, be configured to cause the mesh of cells to be displaced as a function of the displacement of aircraft 10 to provide an indication of speed and displacement of aircraft 10 relative to the flight boundary. In some embodiments, an aspect ratio of W/H (see FIG. 6A) of at least some cells 44A, 44B can be changed (e.g., dynamically and in substantially real-time) as a function of the current location of aircraft 10 so that cells 44A, 44B that are closer to aircraft 10 can be more elongated and cells 44A, 44B that are farther from aircraft 10 are less elongated.

Figure 7:
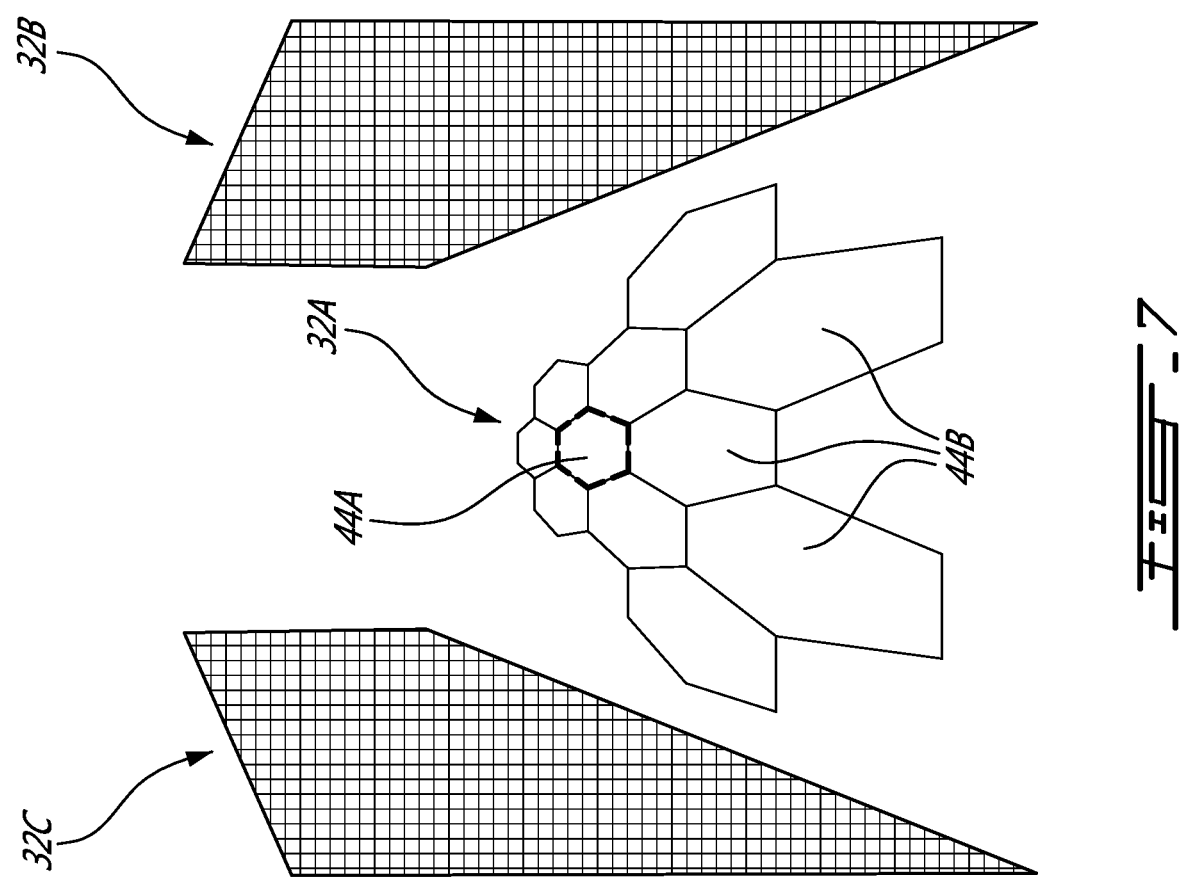
FIG. 7 shows an exemplary surface representing a vertical flight boundary together with two exemplary surfaces representing respective lateral flight boundaries.

FIG. 7 shows an exemplary situation where a plurality of surfaces 32 can be simultaneously displayed to represent respective flight boundaries that are relevant to aircraft 10. For example, surface 32A represents a vertical flight boundary, surface 32B represents a right-hand side lateral flight boundary and surface 32C represents a left-hand side flight boundary. In this embodiment, surface 32A has a different appearance than surfaces 32B and 32C. Flight boundaries of different types could have different appearances in order to distinguish the types of flight boundaries that are simultaneously represented. Alternatively, all types of flight boundaries could have the same or similar appearances.

The use of surface(s) 32 can facilitate the operation of aircraft 10 during required navigation performance (RNP) approaches which can require specific, sometimes non-straight corridors and confinement zones. Accordingly, such flight boundaries could be graphically represented at the pilot's discretion to improve overall safety of RNP approaches and also potentially improve RNP approach performance when an auto-pilot system of aircraft 10 is not engaged.

Figure 8:
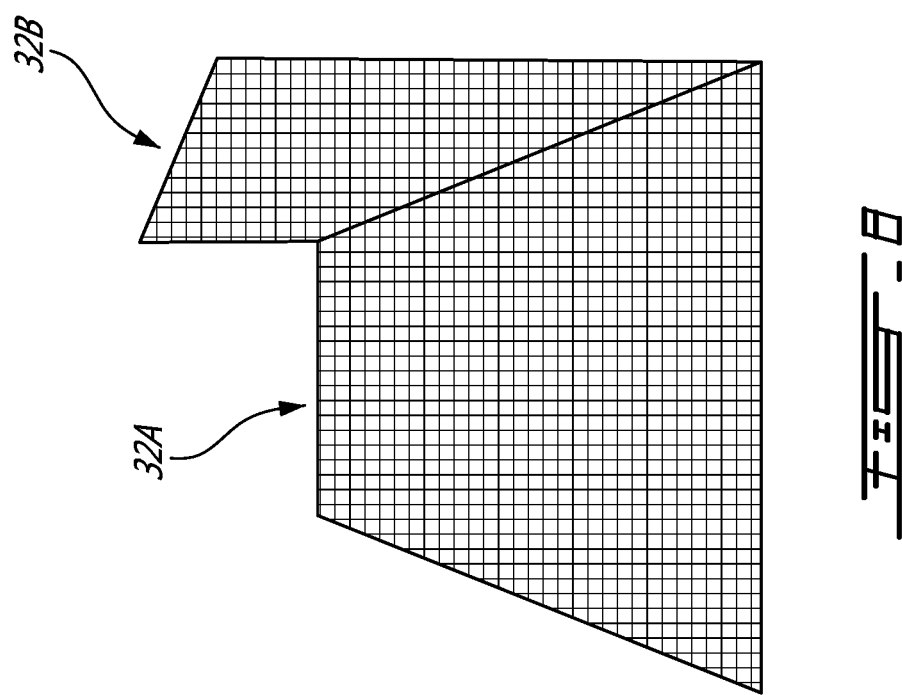
FIG. 8 shows another exemplary surface representing a vertical flight boundary together with one exemplary surface representing a lateral flight boundary.

FIG. 8 shows an exemplary situation where two surfaces 32 are simultaneously displayed. Surface 32A represents a vertical flight boundary and surface 32B represents a right-hand side lateral flight boundary. In this embodiment, surface 32A and surface 32B have different orientations and positions but otherwise have a similar appearance. Alternatively, surfaces 32A, 32B representing different types of flight boundaries can have different appearances.

Figure 9:
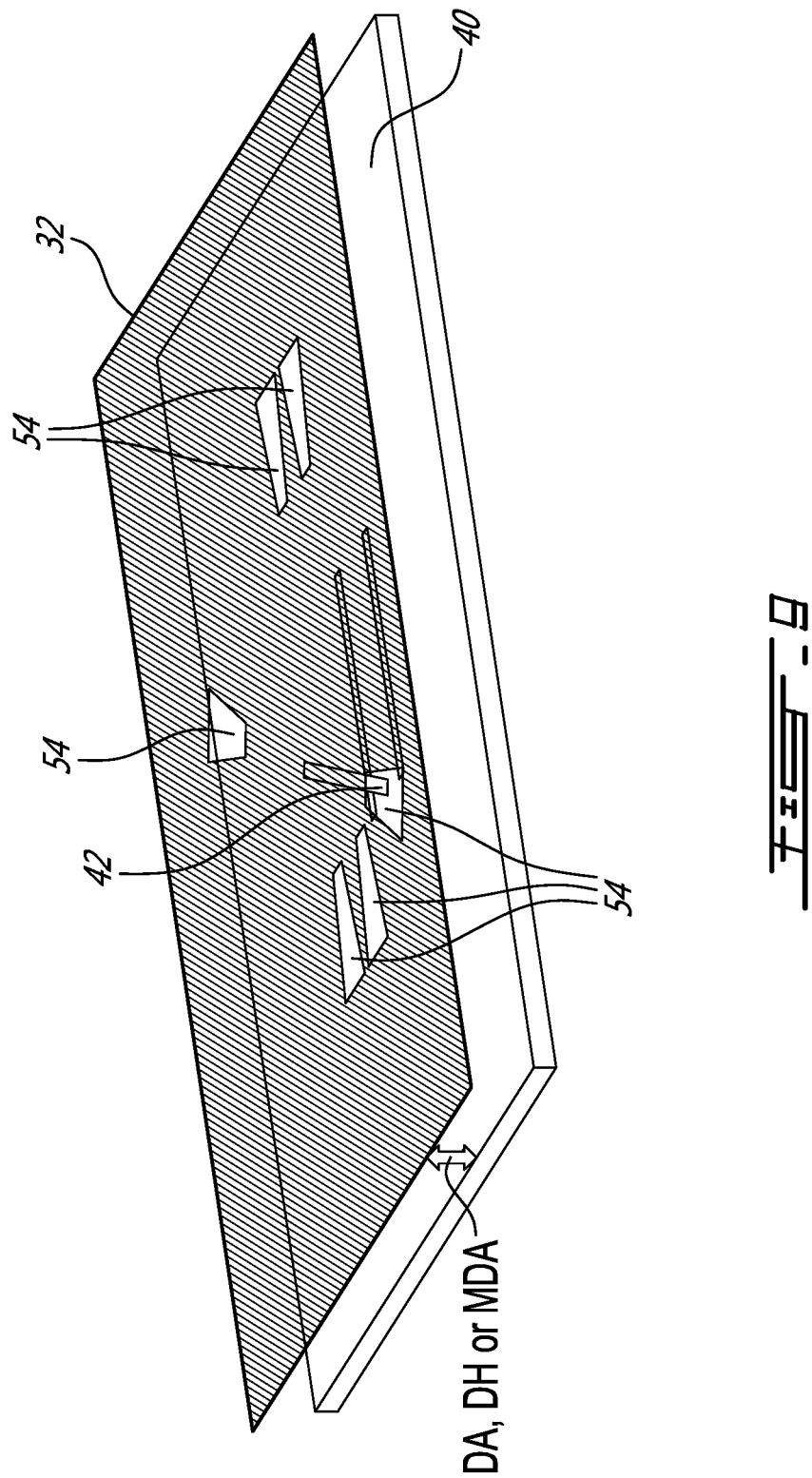
FIG. 9 shows another exemplary surface representing a flight boundary.

FIG. 9 shows another exemplary surface 32 representing a flight boundary such as a DH, DA or MDA disposed over airfield 40 where the presentation of surface 32 is used in the context of an airport surface management system of aircraft 10. In this embodiment, surface 32 can overlay airfield 40 and show penetration zones 54 that can be part of an alert mechanism. FIG. 9 shows six possible penetration zones 54 being highlighted in relation to three runways but in some situations, a single penetration zone 54 could be highlighted based on which runway 42 and which approach path angle has been selected by the pilot. The use of surface 32 could be part of a runway alert system of the surface management system.

FIG. 10 shows an exemplary surface 32 representing a virtual terrain protection floor disposed a predetermined distance D above a ground. In this context, surface 32 can be generated based on information available in a terrain database of a synthetic vision system for example. Surface 32 can be non-planar and generally follow the contour of the ground so that changes in elevation (e.g., peaks and valleys) in the terrain can be reflected by corresponding changes in elevation of surface 32. In some embodiments, surface 32 can represent a vertical offset of the ground surface representing a lower flight boundary (i.e., floor) for operating aircraft 10. Distance D can be selected to provide a minimum safe altitude to operate aircraft 10 during a cruise or descent phase of flight. Surface 32 can have four-sided cells 44, six-sided cells 44 and/or cells 44 of other shape.

FIG. 11 is a flowchart of an exemplary method 100 for assisting a pilot during flight of aircraft 10. Method 100 can be performed using system 22 described herein or using other system(s). For example, machine-readable instructions 30 can be configured to cause computer 24 to perform some or all of method 100. Aspects and functions described above in relation to system 22 can also apply to method 100. In various embodiments, method 100 includes:

receiving data indicative of a current location of aircraft 10 during flight and data indicative of a flight boundary (e.g., see block 102);

using the data indicative of the current location of aircraft 10 and the data indicative of the flight boundary, determining that the flight boundary is relevant to aircraft 10 (e.g., see block 104); and causing display device 14 to display, relative to the current location of aircraft 10, surface 32 graphically representing the flight boundary (e.g., see block 106).

Method 100 can include causing display device 14 to simultaneously display an attitude indicator and surface 32 representing the flight boundary. Surface 32 can be planar or non-planar (e.g., curved). Surface 32 can be at least partially transparent.

Flight boundary can be a lateral or vertical flight boundary.

Surface 32 can have a mesh of cells 44A, 44B displayed thereon. Using data indicative of trajectory 38 of aircraft 10, cell 44A through which aircraft 10 is expected to penetrate the flight boundary can be identified. The identified cell 44A can be visually distinguished from one or more other cells 44B in the mesh of cells.

An appearance of surface 32 can be varied as the distance between aircraft 10 and the flight boundary varies to provide height perception. For example, data indicative of the current location of aircraft 10 relative to the flight boundary can be used to cause a size of cells 44A, 44B to be defined as a function of a distance between aircraft 10 and the flight boundary. Method 100 can include dynamically varying the size of cells 44A, 44B as the distance between aircraft 10 and the flight boundary varies.

An appearance of surface 32 can be dynamically varied as the speed of aircraft 10 varies to provide some speed perception. Method 100 can include defining an aspect ratio of cells 44A, 44B as a function of the current location of aircraft 10. At least some cells 44A, 44B can be hexagons.

The flight boundary represented by surface 32 can be a DH, a DA or a MDA associated with an approach conducted under instrument flight rules. The flight boundary represented by surface 32 can be a virtual terrain protection floor disposed above a ground by a predetermined distance D. Data indicative of terrain can be used to cause surface 32 to depict a change in elevation indicative of a corresponding change in elevation in the terrain. The flight boundary can demarcate restricted airspace.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for assisting a pilot during flight of an aircraft, the apparatus comprising:
    a display device;
    one or more processors operatively connected to the display device; and
    a non-transitory machine-readable memory operatively connected to the one or more processors, storing instructions executable by the one or more processors and configured to cause the one or more processors to:
    using data indicative of a current location of the aircraft during flight and data indicative of a flight boundary to be crossed by the aircraft, determine that the flight boundary is within a predetermined distance threshold between the current location of the aircraft and the flight boundary; and
    generate an output configured to cause the display device to display, relative to the current location of the aircraft, a surface graphically representing the flight boundary.

2. The system as defined in claim 1, wherein the output is configured to cause the display device to simultaneously display an attitude indicator and the surface representing the flight boundary.

3. The system as defined in claim 1, wherein the surface is planar.

4. The system as defined in claim 1, wherein the surface is non-planar.

5. The system as defined in claim 1, wherein the surface is at least partially transparent.

6. The system as defined in claim 1, wherein the flight boundary is a lateral flight boundary.

7. The system as defined in claim 1, wherein the flight boundary is a vertical flight boundary.

8. The system as defined in claim 7, wherein the output is configured to cause the display device to display a mesh of cells on the surface.

9. The system as defined in claim 8, wherein the instructions are configured to cause the one or more processors to:
    using data indicative of a trajectory of the aircraft, identify one of the cells through which the aircraft is expected to penetrate the flight boundary; and
    cause the identified cell to be visually distinguished from one or more other cells in the mesh of cells.

10. The system as defined in claim 8, wherein the instructions are configured to cause the one or more processors to cause a size of the cells in the mesh of cells to be defined as a function of a distance between the aircraft and the flight boundary.

11. The system as defined in claim 10, wherein the instructions are configured to cause the one or more processors to cause the size of the cells to dynamically vary as the distance between the aircraft and the flight boundary varies.

12. The system as defined in claim 8, wherein the instructions are configured to cause the one or more processors to cause an aspect ratio of the cells to be defined as a function of the current location of the aircraft.

13. The system as defined in claim 8, wherein at least some of the cells are hexagons.

14. The system as defined in claim 1, wherein the instructions are configured to cause the one or more processors to cause an appearance of the surface to vary as a distance between the aircraft and the flight boundary varies.

15. The system as defined in claim 1, wherein the flight boundary is a decision height, a decision altitude or a minimum descent altitude associated with an approach conducted under instrument flight rules.

16. The system as defined in claim 1, wherein the flight boundary is a virtual terrain protection floor disposed a predetermined distance above a ground.

17. The system as defined in claim 1, wherein:
    the flight boundary is a virtual terrain protection floor disposed a predetermined distance above a ground; and
    the instructions are configured to cause the one or more processors to, using data indicative of terrain, cause the surface to depict a change in elevation indicative of a corresponding change in elevation in the terrain.

18. The system as defined in claim 1, wherein the flight boundary demarcates a restricted airspace.

19. The system as defined in claim 1, wherein the display device is a head-down display device.

20. The system as defined in claim 1, wherein the display device is a head-up display device.

* * * * *